US006592112B2

United States Patent
Bishop et al.

(10) Patent No.: US 6,592,112 B2
(45) Date of Patent: Jul. 15, 2003

(54) VEHICLE SUSPENSION STRUT MOUNT ASSEMBLY WITH INTEGRAL BEARING AND MULTIPLE LOAD PATHS

(75) Inventors: Todd A. Bishop, Centerville, OH (US); Dennis R. Hurst, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/817,562

(22) Filed: Mar. 26, 2001

(65) Prior Publication Data
US 2002/0135111 A1 Sep. 26, 2002

(51) Int. Cl.[7] .............................. B60G 13/00; F16F 9/00
(52) U.S. Cl. .................................. 267/220; 188/321.11
(58) Field of Search ........................ 267/33, 219, 220; 280/124.155, 124.154, 124.147, 124.164, 124.165; 188/321.11

(56) References Cited

U.S. PATENT DOCUMENTS

| | | | | |
|---|---|---|---|---|
| 4,175,771 A | * | 11/1979 | Muzechuk et al. | ......... 267/220 |
| 4,981,287 A | * | 1/1991 | Cothenet | ..................... 267/220 |
| 5,788,262 A | * | 8/1998 | Dazy et al. | ................... 267/220 |
| 6,161,822 A | * | 12/2000 | Hurst et al. | .................. 267/220 |

* cited by examiner

Primary Examiner—Jack Lavinder
Assistant Examiner—Thomas J. Williams
(74) Attorney, Agent, or Firm—Scott A. McBain (57) ABSTRACT

A mount assembly for a vehicle suspension strut includes a mount plate assembly having upper and lower plate members secured together and supporting a cushion member. The cushion member is secured to a retainer which is secured directly to a damper piston rod or through a bearing assembly. Multiple load paths may be provided by a bumper mounted on a spring seat member secured to the piston rod and engageable with the lower plate of the plate assembly for transferring jounce loads directly to the vehicle body structure. The steering bearing may be mounted to engage the lower plate for transferring loads directly through the bearing and the lower plate to the body structure. The plate assembly may include a composite upper plate member.

2 Claims, 8 Drawing Sheets

VEHICLE SUSPENSION STRUT MOUNT ASSEMBLY WITH INTEGRAL BEARING AND MULTIPLE LOAD PATHS

FIELD OF THE INVENTION

The present invention pertains to a motor vehicle suspension strut mount assembly which includes an integral strut bearing and embodiments which provide for multiple load paths to transfer normal suspension loads and wheel jounce to the vehicle body structure. The invention also provides an improved mount plate assembly with a composite upper plate and transmission of only strut damper loads into the upper plate.

BACKGROUND

In the production of automotive vehicles, there is an ever present need to provide a variety of vehicle configurations to serve a wide variety of customer needs and desires. Concomitantly, it is desirable to minimize production costs by providing parts which may be interchanged across various vehicle models or by developing a family of components using common parts or parts which may be sufficiently similar in configuration to minimize engineering, material and production costs.

Vehicle components which may benefit from the use of common parts while providing for specific different performance characteristics include suspension mount assemblies, particularly mount assemblies used in conjunction with so-called McPherson strut type suspensions. In McPherson strut type suspensions for vehicle steerable wheels, a rolling element bearing assembly usually forms a support between the strut damper piston rod and the vehicle body structure and a single load path for suspension spring loads, damper induced loads and wheel jounce loads is provided. However, it is desirable to distribute these loads to minimize wear and tear on such bearing assemblies.

It is also desirable to provide a family of mount assemblies or mechanisms to provide the flexibility to change the ride and handling characteristics required of different vehicles while providing for essentially the same mount assembly across vehicle product lines. It is further deemed desirable to minimize the costs associated with the manufacture of such mount assemblies or mechanisms by reducing the assembly complexity, allowing optimization of suspension loads transmitted into the vehicle and modifying vehicle ride characteristics without significant vehicle configuration changes and while also minimizing the number of mount assembly designs. It is to these ends that the present invention has been developed.

SUMMARY OF THE INVENTION

The present invention provides an improved suspension strut mount assembly for a motor vehicle having a so-called McPherson strut type or similar type suspension mechanism.

In accordance with one aspect of the present invention, an improved vehicle mount assembly is provided including a so-called integral steering bearing wherein suspension spring loads, damper loads and wheel jounce loads may transmit through the bearing to the vehicle body structure, thus forming a single load path. Alternatively, the mount assembly may be configured such that spring loads, suspension strut damper loads and wheel jounce loads may be transmitted through different load paths to the vehicle body structure.

In accordance with another aspect of the present invention, a mount assembly is provided for a strut type vehicle suspension wherein damper loads and wheel jounce loads are transmitted through suitable elastomer load transmission members to the vehicle body structure and a so-called external bearing arrangement is provided in certain embodiments of the mount assembly to provide a dual load path mount or a triple load path mount for transmitting suspension loads to the vehicle body structure.

In accordance with another important aspect of the invention, a vehicle suspension strut mount plate assembly is provided which utilizes a plate member of non-metal composite construction. The plate assembly is configured such that only strut damper loads are transmitted into the upper plate of the mount plate assembly and vehicle jounce bumper loads are transmitted directly from a lower plate of the mount plate assembly to the vehicle body structure. The configurations of the upper and lower plates of the mount plate assembly are such that metal to metal contact is provided in the fastener load path to provide suitable clamping of the mount plate assembly retention, the shape of the composite upper plate can be varied to tune the mount for desired performance characteristics. Circumferentially spaced radially extending ribs or other suitably shaped members are molded into the composite upper plate to insure that the upper plate is tightly trapped between the lower plate and the so-called tower part of the vehicle body structure to minimize movement and noise and to provide a direct load path for damper loads.

Those skilled in the art will further appreciate the above-mentioned advantages and superior features of the invention together with other important aspects thereof upon reading the detailed description which follows in conjunction with the drawings.

DETAILED DESCRIPTION OF THE PREFERRED EMBODIMENTS

In the description which follows, like parts are marked throughout the specification and drawings with the same reference numerals, respectively. The drawing figures are not necessarily to scale and certain features may be shown in somewhat generalized form in the interest of clarity and conciseness.

Figure 1:
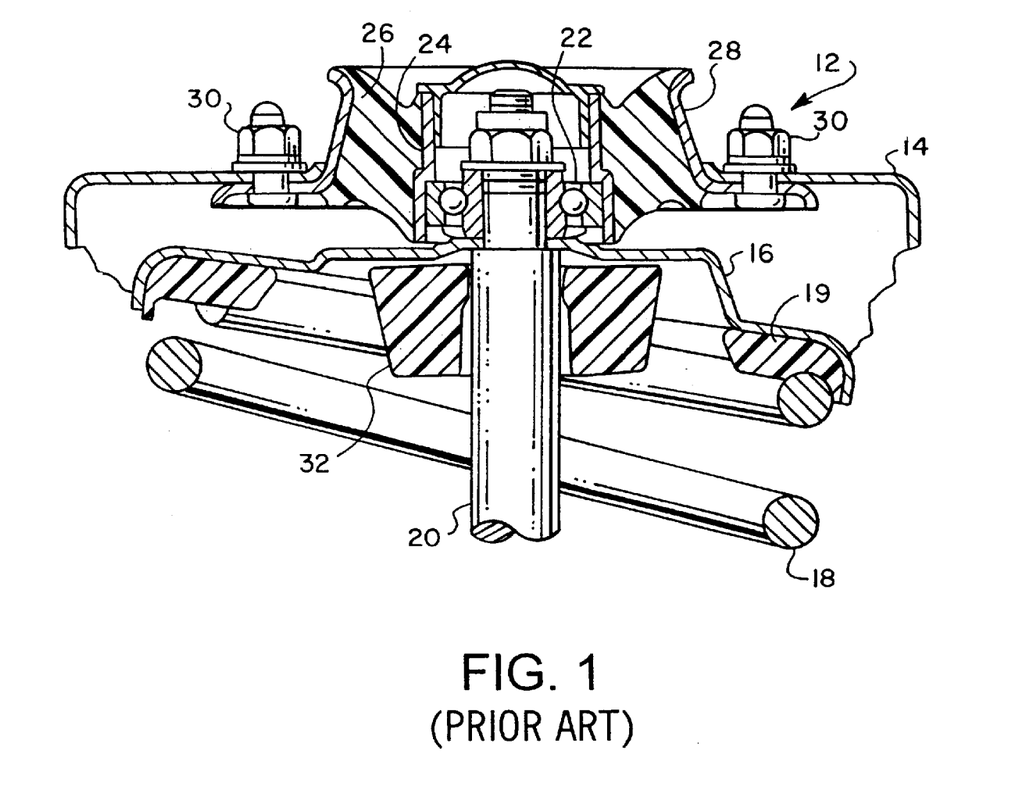
FIG. 1 is a longitudinal central section view of a typical prior art vehicle suspension strut mount assembly.

Referring to FIG. 1, there is illustrated a prior art single load path strut mount assembly for an automotive vehicle, generally designated by the numeral 12. The strut mount assembly 12 is shown connected to a generally cylindrical inverted cup shaped, so-called tower member 14 forming part of a vehicle body structure and adapted to be connected to the strut mount assembly, as shown. The mount assembly 12 comprises a generally cylindrical inverted pan shaped spring seat 16 including an annular elastomeric cushion member 19 engageable with one end of a coil suspension spring 18 of a McPherson strut type vehicle suspension assembly. A fluid damper piston rod 20 extends upward through the spring 18 and is connected to a rolling element steering bearing assembly 22, the outer race of which is contained within a cylindrical sleeve 24 which is suitably secured within an annular elastomeric support member 26. Support member 26 is also secured to a somewhat frusto-conical shaped mounting plate member 28 suitably secured to the body structure or tower 14 by threaded fastener bolt and nut assemblies 30. An annular jounce bumper 32 formed of a suitable elastomer is sleeved over the piston rod 20. All suspension loads are absorbed by the bearing assembly 22 in the mount assembly 12, including loads imposed by the suspension spring 18 through the seat 16, damper loads transmitted by the piston rod 20 and any wheel jounce loads which result in the damper cylinder end face, not shown, engaging the jounce bumper 32.

Figure 2:
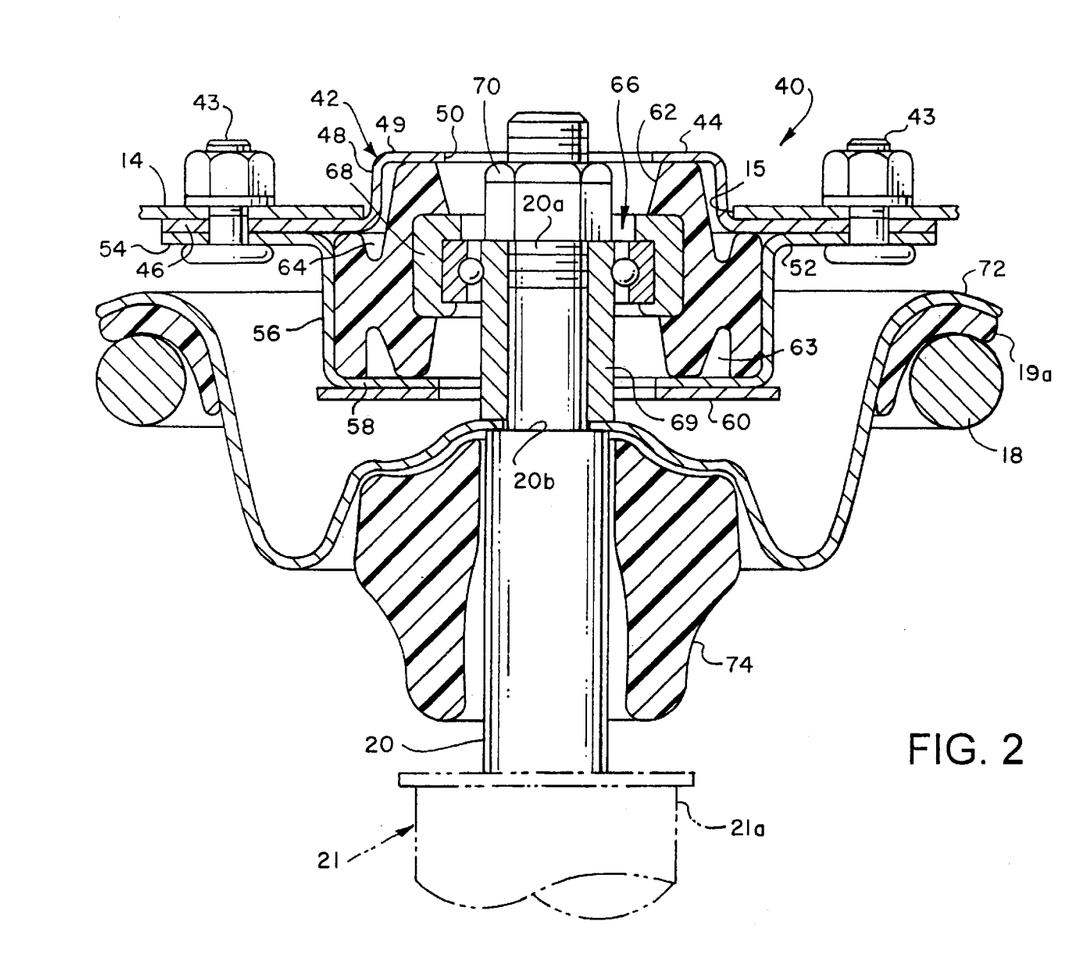
FIG. 2 is a longitudinal central section view of one preferred embodiment of a strut mount assembly in accordance with the invention.

Referring now to FIG. 2, there is illustrated a strut mount assembly in accordance with one embodiment of the present invention and generally designated by the numeral 40. The mount assembly 40 includes an improved mount module or mount plate assembly 42, including a generally cylindrical upper plate 44 having an annular flange 46 engageable with the vehicle body structure or tower 14. Plate 44 also includes a cylindrical hub portion 48 projecting axially above the flange 46 and through a cylindrical opening 15 in the tower 14 and delimited by an annular shoulder or end face 49 having an opening 50 therein to provide access to the distal end of piston rod 20 of a strut damper 21. The mount plate assembly 42 includes a lower mount plate 52 including an annular flange 54 contiguous with the flange 46 of plate 42 and suitably secured thereto. Lower plate 52 includes an axially projecting cylindrical hub portion 56 projecting in a direction opposite the hub portion 48 and including a transverse annular shoulder or end face 58 which is preferably reinforced by and secured to an annular bumper plate 60. The mount plate assembly 42 is suitably secured to the vehicle body tower 14 by circumferentially spaced machine bolt and nut assemblies 43.

The mount plate assembly 42 also includes an annular elastomer cushion member 62 disposed between and within a space defined by hub portions 48 and 56 and including opposed annular channel portions 63 and 64 disposed back to back to allow displacement of the cushion member under substantial lateral as well as axial loads. An integral rolling element steering bearing assembly 66 is mounted in the cushion member 62 by a suitable adapter ring 68. Inner race 69 of bearing assembly 66 is sleeved over a reduced diameter tenon portion 20a of damper rod 20 and is retained in engagement with the bearing assembly by a hex nut 70. A generally cylindrical, contoured coil spring seat 72 is also secured to the rod 20 between a shoulder 20b and bearing race 69. Spring seat 72 includes an annular spring cushion member 19a engageable with one end of a coil spring 18. An annular jounce bumper 74, formed of a suitable elastomeric material, is sleeved over the piston rod 20 and is preferably suitably secured to the spring seat 72. Although the mount assembly 40 is configured such that suspension spring loads, damper loads and wheel jounce loads are all transmitted through the bearing assembly 66 and the cushion member 62 to the vehicle body at the tower structure 14, the mount plate assembly 42 provides certain advantages and is of a configuration which may be adapted for multiple load path type mount assemblies described hereinbelow and shown in drawing FIGS. 3 through 6.

Figure 3:
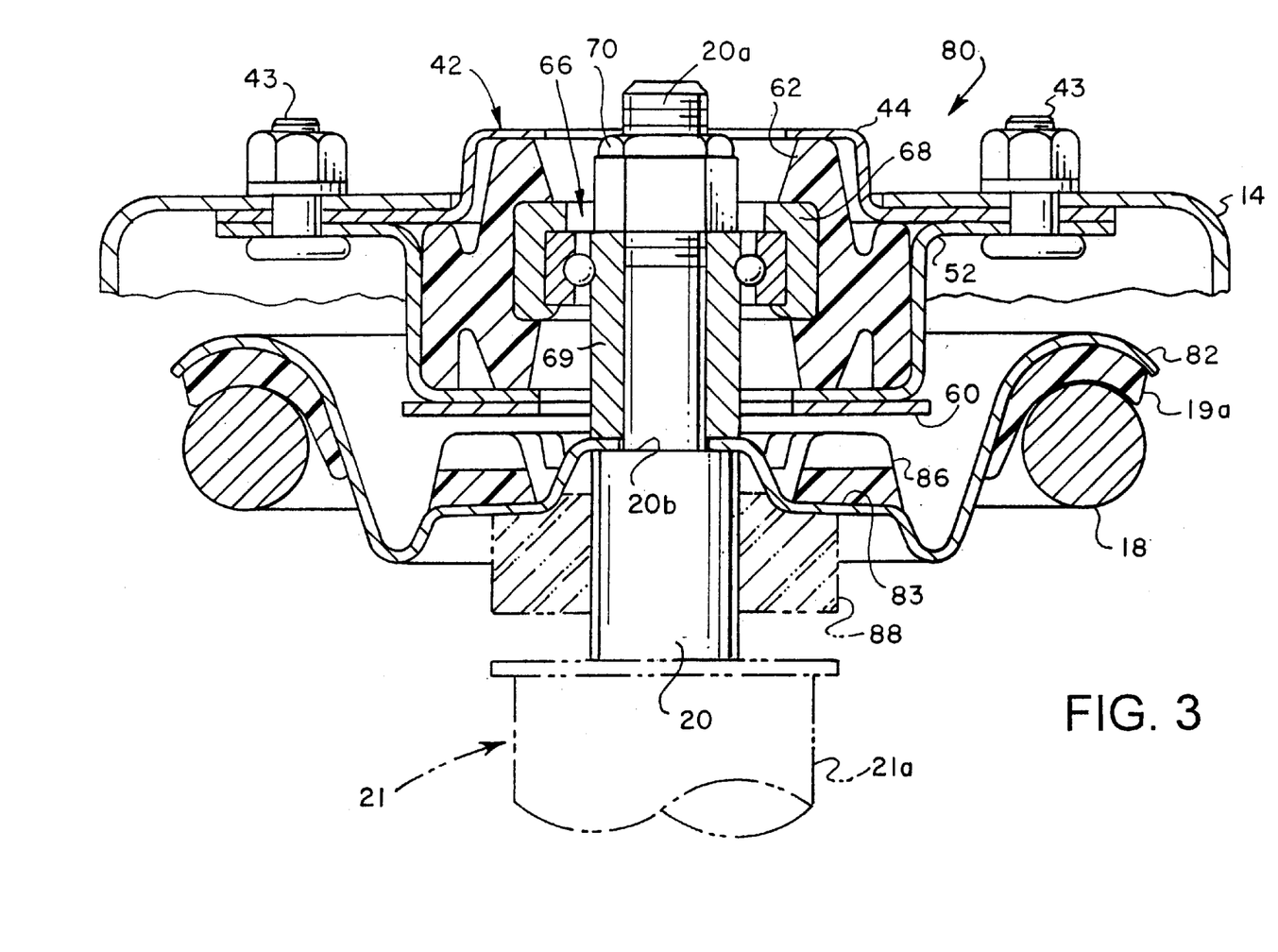
FIG. 3 is a longitudinal central section view of a first alternate embodiment of a strut mount assembly in accordance with the invention.

For example, referring to FIG. 3, mount plate assembly 42 and bearing assembly 66 are connected to the strut damper piston rod 20 in the same manner as for the mount assembly 40 but are part of a mount assembly 80 which provides two load paths for transmitting loads from the suspension strut to the vehicle body structure represented by the tower 14. In the strut assembly 80, a modified annular spring seat 82 is provided, engageable with the upper end of coil spring 18 via a cushion member 19a and is secured on the rod 20 between the bearing inner race 69 and the shoulder 20b in the same manner as the spring seat 72. However, spring seat 82 includes an inner annular hub 83 on which is mounted an annular elastomer jounce bumper 86. Jounce bumper 86 is operable under sudden loads, which cannot be adequately reacted by the spring 18 and damper 21 and which result in forcible engagement of the end face of damper cylinder 21a with the seat hub 83. Such action results in engagement of bumper 86 with the plate assembly 42 to transfer jounce loads directly through the plate assembly, including lower plate 52 and flange 46 of upper plate 44, to the body structure or tower 14. Spring loads and normal damper loads are still transmitted through the bearing assembly 66, the cushion member 62 and the plates of the mount plate assembly 42 to the tower structure 14.

The mount assembly 80 is also preferably provided with a compressible elastomeric annular jounce stop member 88 sleeved over the piston rod 20 and preferably secured to the spring seat 82 in a suitable manner. Jounce stop member 88 is operable to prevent direct contact between the spring seat 82 and the strut damper body or cylinder 21a. Compressible jounce stop member 88 also aids in absorbing and transferring suspension loads via the path which includes the jounce bumper 86 and the mount plate assembly 42.

Figure 4:
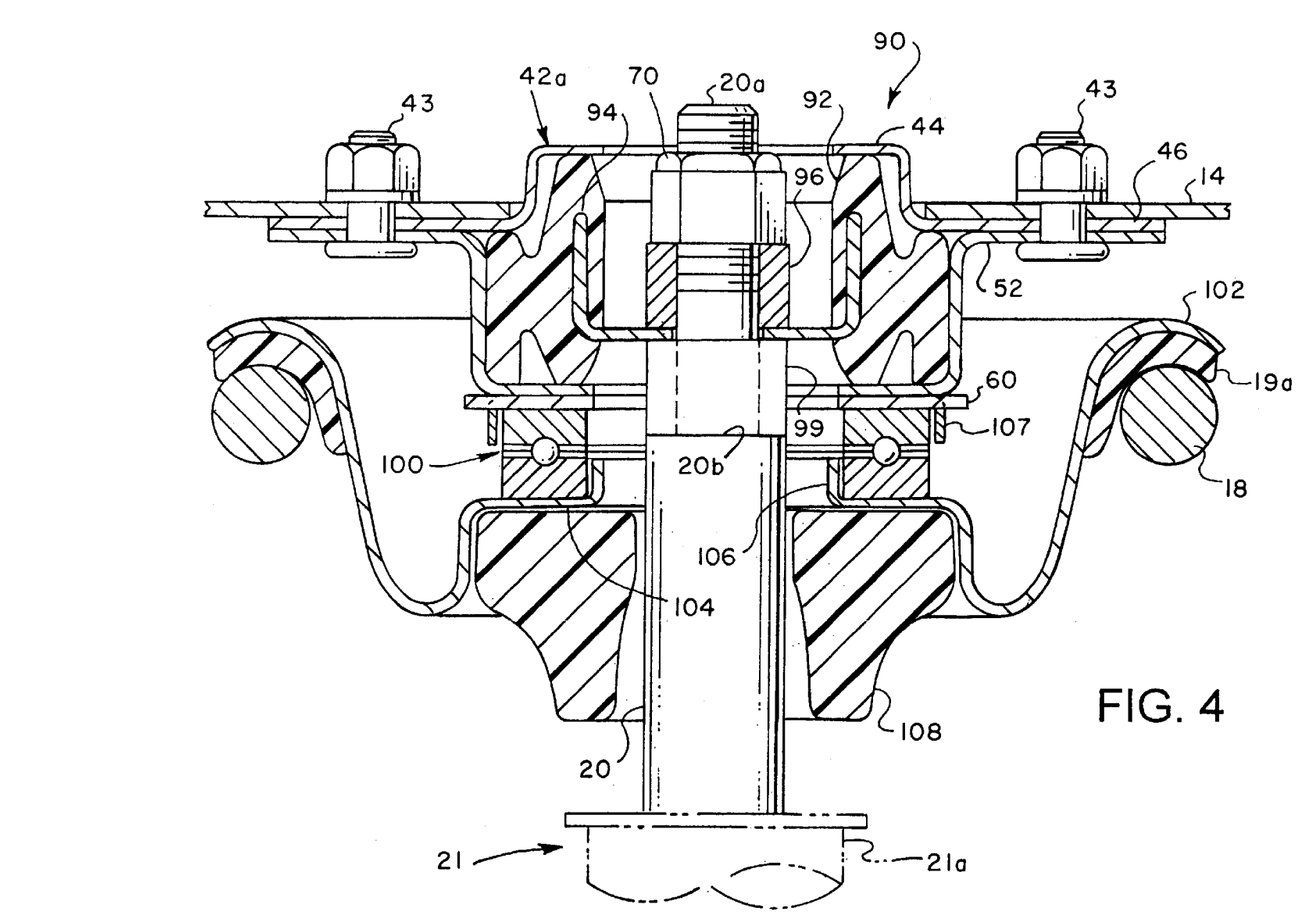
FIG. 4 is a longitudinal central section view of a second alternate embodiment of a strut mount assembly in accordance with the invention.

Referring now to FIG. 4, another embodiment of a strut mount assembly in accordance with the invention is illustrated and generally designated by the numeral 90. The mount assembly 90 includes a mount plate assembly 42a similar in most respects to the mount plate assembly 42. However, the cushion member 62 and integral steering bearing assembly 66 have been replaced by a cushion member 92, similar in most respects to the cushion member 62, but integrally molded with or otherwise secured to a generally cylindrical cup shaped retainer member 94 in place of the bearing retainer 68. A cylindrical adapter sleeve 96 is preferably sleeved over rod tenon 20a and interposed the nut 70 and the retainer 94. The retainer 94 is also interposed the adapter 96 and a cylindrical spacer 99 also sleeved over the tenon part 20a of piston rod 20. Alternatively, damper piston rod 20 could be replaced with a rod providing a shoulder at the proper position for engagement with the retainer 94.

The mount assembly 90 includes a so-called external steering bearing comprising a rolling element thrust bearing assembly 100 suitably retained between the plate assembly 42a and a generally cylindrical contoured spring seat 102 having a hub part 104 formed with an axially extending annular flange 106 for locating the bearing assembly 100. Bearing assembly 100 may also be suitably located with respect to the plate assembly 42a by depending locating tabs 107 circumferentially spaced apart on and forming part of plate member 60 in the manner shown in FIG. 4. Mount assembly 90 also includes a compressible or elastically deformable elastomer jounce bumper 108 sleeved over damper piston rod 20 and suitably retained in engagement with the spring seat 102 at the hub part 104 on the side opposite the bearing assembly 100. The strut mount assembly 90 reacts normal suspension loads transmitted through spring 18 through the external bearing 100 and the plate assembly 42a by way of lower plate 52 and upper plate flange 46 directly to body tower 14. Severe wheel jounce loads resulting in damper cylinder engagement of the bumper 108 are also reacted through the bearing assembly 100 and the plate assembly 42a in the manner just described for spring loads. However, strut damper loads imposed by the piston rod 20 are transmitted to and through retainer 94, cushion member 92 and upper plate 44 to the tower or body structure 14.

Figure 5:
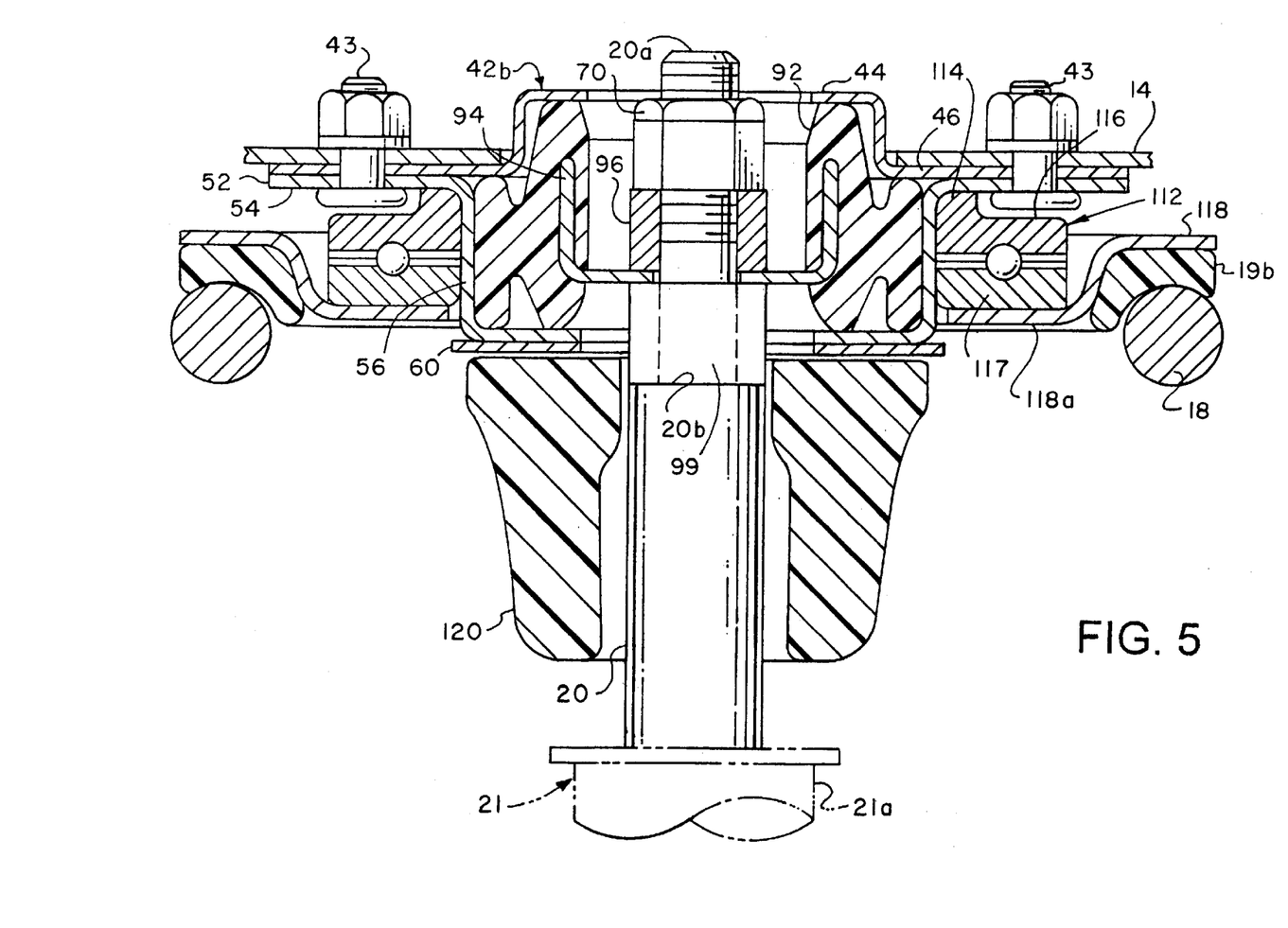
FIG. 5 is a longitudinal central section view of a third alternate embodiment of a strut mount assembly in accordance with the invention.

Referring now to FIG. 5, still another embodiment of a mount assembly in accordance with the invention is illustrated and generally designated by the numeral 110. Mount assembly 110 utilizes a plate assembly 42b substantially like the plate assemblies 42 and 42a, and including the cushion member 92 and retainer 94. Plate assembly 42b does not include a steering bearing locator flange for an external bearing as required by the mount assembly 90 of FIG. 4. However, the mount assembly 110 includes an enlarged diameter external bearing assembly 112 which is sleeved over the hub 56 of lower plate 52 and is engageable with flange 54 of lower plate 52 at a shoulder 114 of upper bearing race 116, as shown. A modified cylindrical spring seat 118 and modified spring cushion member 19b are provided for reacting spring loads from spring 18 through bearing assembly 112. Lower bearing race 117 of bearing assembly 116 is engaged with an inner circumferential hub part 118a of the seat 118. Spring loads are thus transmitted directly through bearing assembly 112 and the flanges of plates 44 and 52 to tower 14.

A modified annular jounce bumper 120, formed of a suitable elastomer, is sleeved over the damper piston rod 20 and is engaged with an end plate 60 of the plate assembly 42b to react jounce loads imposed on the mount assembly 110 directly through the plate assembly 42b to the tower 14. Normal suspension spring loads are, of course, reacted through the bearing assembly 112 to the plate flange 54 and the upper plate flange 46 to the vehicle tower 14. Damper loads imposed on piston rod 20 are reacted through the retainer 94, the cushion member 92 and the plate assembly 42 to the tower 14. Accordingly, three load paths are provided by the mount assembly 110 for transferring spring loads, damper loads and jounce loads to the tower 14.

Figure 6:
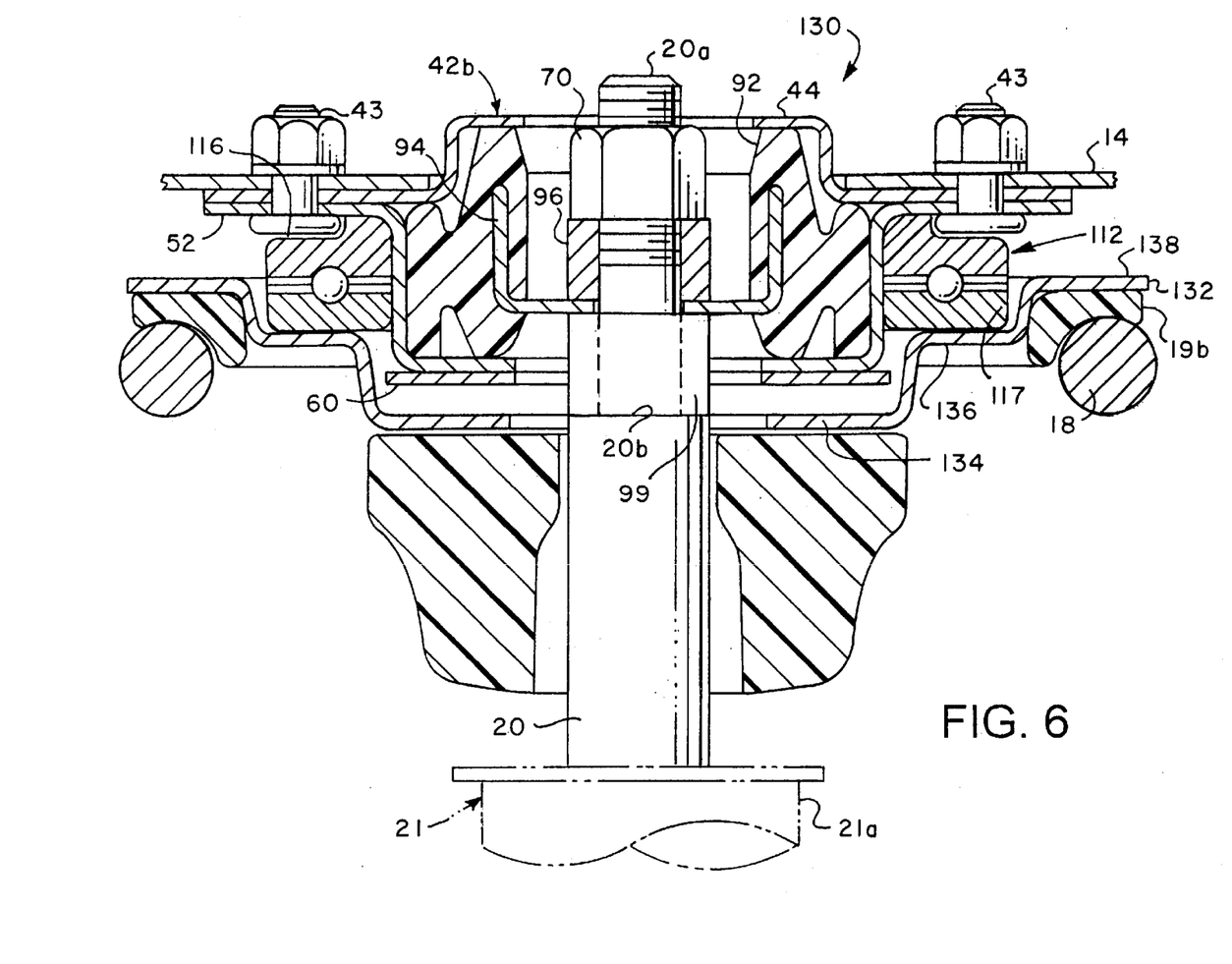
FIG. 6 is a longitudinal central section view of a fourth alternate embodiment of a strut mount assembly in accordance with the invention.

Referring now to FIG. 6, still another embodiment of a mount assembly in accordance with the invention is illustrated and designated by numeral 130. The mount assembly 130 is substantially like the mount assembly 110 except for a modified spring seat 132 which is characterized by a circumferential hub part 134 offset axially from an annular intermediate part 136 which is engageable with bearing assembly 112 and which is axially offset from an outer circumferential spring engaging part 138, as illustrated. Spring 18 engages seat 132 by way of a cushion member 19b. A modified jounce bumper 140 is engageable with the hub part 134 of spring seat 132. Hub part 134 is axially spaced from the plate assembly 42b so that spring loads and wheel jounce loads are reacted through bearing assembly 112 while only damper loads are reacted from piston rod 20 through the cushion member 92 of the plate assembly 42b.

Accordingly, the embodiments of the invention illustrated in FIGS. 2 through 6 provide mount assemblies having substantial commonality of parts but also providing for different load paths for reacting suspension loads and in a way such that various ride and handling characteristics may be obtained for vehicles equipped with the respective mount assemblies shown and described. In other words, the basic mount design is similar for all configurations except for changes in the parts indicated and described.

Figure 7:
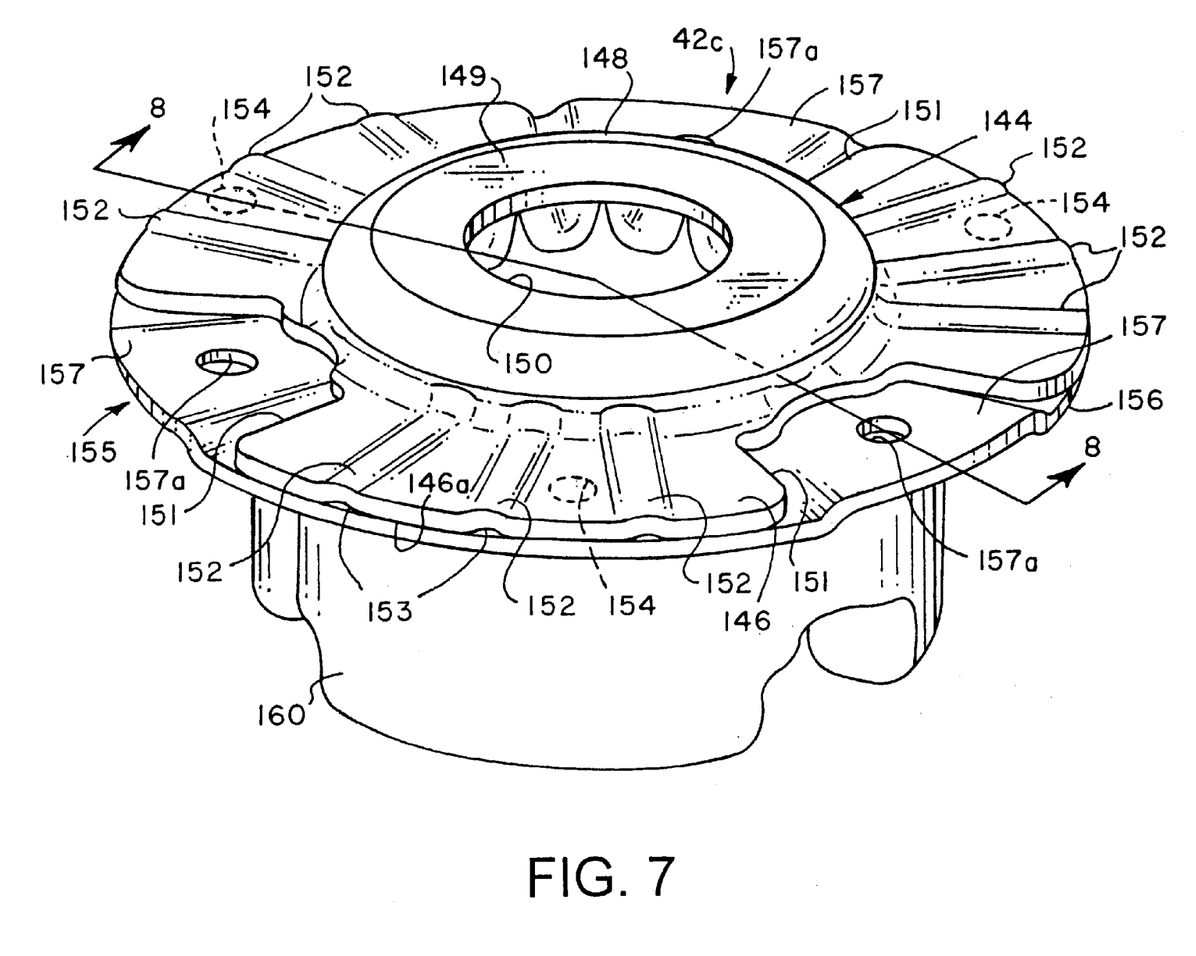
FIG. 7 is a perspective view of a strut mount plate assembly in accordance with the invention.
Figure 8:
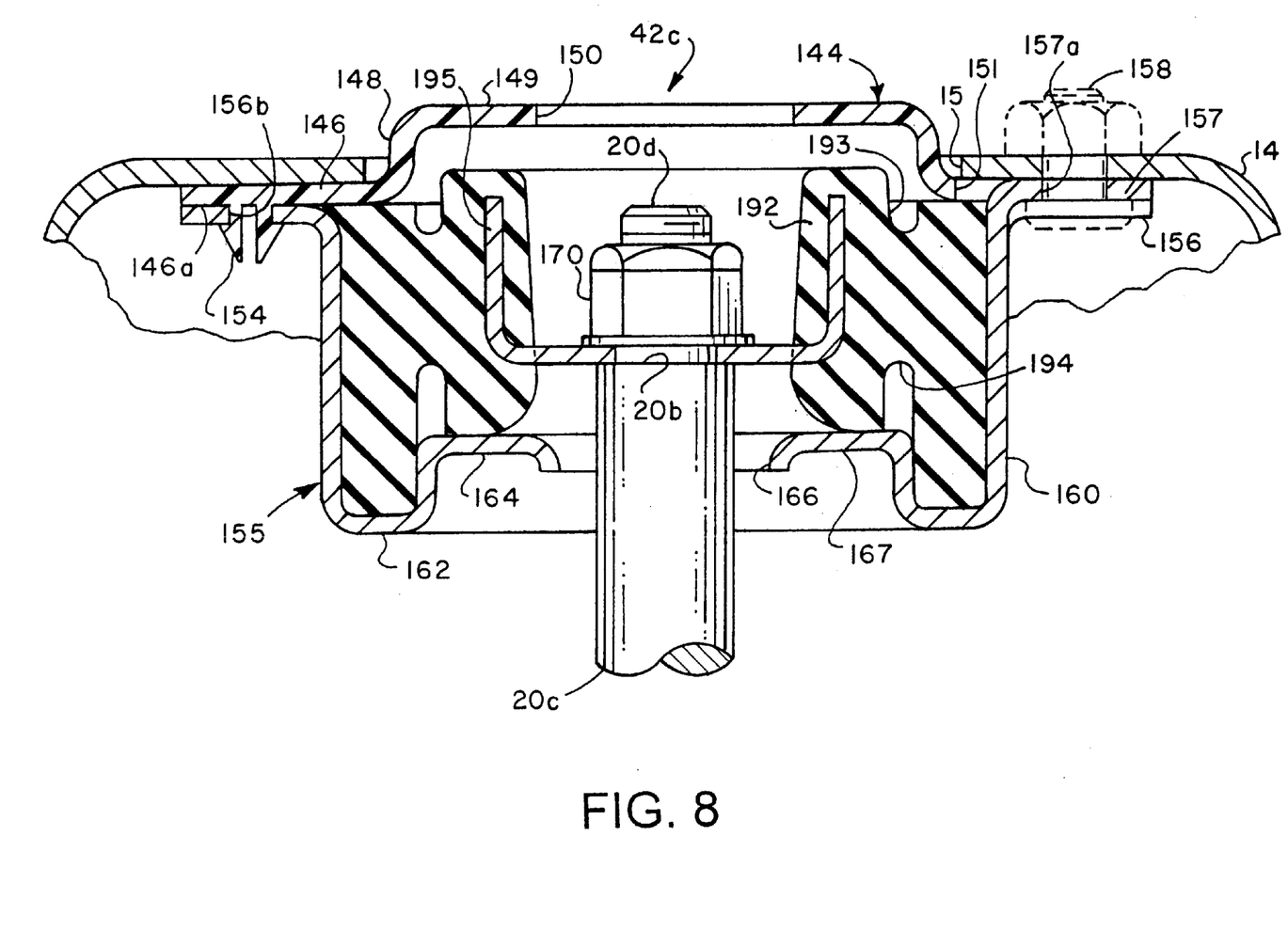
FIG. 8 is a section view taken generally along the line 8—8 of FIG. 7.

Referring now to FIGS. 7 and 8, a modified mount plate assembly is illustrated and generally designated by the numeral 42c. Plate assembly 42c is similar in some respects to the plate assemblies 42, 42a and 42b but is, preferably, at least partially constructed of composite materials. Plate assembly 42c includes an upper, generally cylindrical plate member 144 including an annular outer flange 146 and an axially offset hub part 148 including a circumferential end face or flange 149 delimited by a cylindrical opening 150. As shown in FIG. 7, the flange 146 is relieved at three circumferentially spaced places by radially inwardly extending recesses 151.

Circumferential flange 146 is also characterized by spaced apart radially projecting ribs 152, three shown for each segment of the flange formed between the recesses 151. The ribs 152 are configured such that they form, in a relaxed condition of the flange 146, radial, circumferentially spaced grooves 153 in the lower face 146a of flange 146. Circumferentially spaced integral fastener members 154, one shown in FIG. 8, are also integrally formed, preferably, on the flange 146 and are characterized by deflectable barbs. The plate 144 is preferably formed of a so-called composite, nonmetal material such as glass-filled nylon or similar plastic materials. The shape and thickness of the plate 144 may be varied to tune the strut mount associated with the plate assembly 42c for particular desired performance characteristics. The ribs 152 are provided to insure metal to metal contact between a lower plate, to be described further herein, and the tower 14 when the plate assembly 42c is secured to the tower. In other words, when the ribs 152 are deflected due to compressive fastener loads acting on the lower plate of the plate assembly 42c, the lower plate is brought into engagement with the tower as will be explained in further detail herein. The ribs 152 also insure that the upper plate 144 is tightly trapped between the lower plate and the tower 14 under all dimensional tolerance conditions to prevent any movement of the plate assembly and the potential for noise associated therewith. The ribs 152 also provide a direct load path for damper loads that are transmitted into the upper plate 144 and then transmitted into the tower 14.

Referring further to FIGS. 7 and 8, a lower plate 155 of plate assembly 42c is provided with a circumferential outer flange 156 having three circumferentially spaced axially offset fastener pads 157 formed thereon and spaced apart at the same dimensional spacings as the recesses 151 in upper plate 144. Fastener pads 157 are provided with suitable fastener receiving holes 157a formed therein for receiving suitable bolt and nut fastener assemblies 158, one shown in FIG. 8, for securing the plate assembly 42c to the tower 14.

Lower plate 155 is also provided with an axially projecting hub 160 projecting in a direction opposite the hub 148 and delimited by an annular end face 162 which includes an axially offset inwardly displaced end face part 164 delimited by a cylindrical opening 166 and forming a jounce bumper engagement surface 167. An annular elastomeric cushion member 192 is disposed between the plates 144 and 154 and is formed with annular, oppositely projecting recess portions 193 and 194. A cup shaped retainer 195 is integrally molded with the cushion member 192 and is adapted to be connected to a tenon 20*d* of a modified damper piston rod 20*c* by a suitable threaded nut 170. Elastomeric cushion member 192 is secured between the plates 144 and 155 and the plates are secured to each other, preferably, by the previously mentioned spaced apart fasteners 154 which are operable to project through suitable fastener receiving holes 156*b*, one shown in FIG. 8, formed in the flange 156. Other means for securing the plates 144 and 155 in assembly with each other may be provided.

The mount plate assembly 42*c* is advantageous in that only the strut damper loads transmitted from the piston rod 20*a* into the cushion member 192 are transmitted to the upper composite plate 144 and then to the tower 14. The typically higher intensity jounce bumper loads are imposed on the lower surface 167 of lower plate 155 and then directly from the lower plate by way of plate flanges 156 and 146 to the tower 14. The routing of wheel jounce bumper loads directly into the tower 14 through the lower plate 155 allows the use of a lower cost and lower strength composite material for the upper plate 144. The axially offset pads 157 for the lower plate 155 provide for metal-to-metal contact between the lower plate and the tower 14 and thus provide favorable clamping load retention characteristics comparable to conventional mount plate assemblies. As previously mentioned, the ribs 152 are deflectable to insure metal-to-metal contact between the pads 157 and the tower 14. The ribs 152 also provide a direct load path for the aforementioned damper loads that are transmitted through plate 144. An additional advantage of the composite upper plate 144 is the provision of additional noise and vibration isolation as compared with plates formed with materials traditionally used for the upper plate member.

The construction and use of the strut mount assemblies and parts thereof described hereinbefore and shown on the accompanying drawings is believed to be understandable to those of ordinary skill in the art based on the description and drawings. Although preferred embodiments of the invention have been described in detail, those skilled in the art will further appreciate that various substitutions and modifications may be made to the invention without departing from the scope and spirit of the appended claims.

What is claimed is:

1. In a suspension strut of a vehicle, said suspension strut including a spring and a spring damper, a strut mount assembly comprising:

a mount plate assembly adapted to be connected to a body structure of said vehicle, said plate assembly including an upper plate, a lower plate and a damper cushion member interposed said upper and lower plates;

a connector for connecting a member of said damper to said cushion member; and a spring seat for reacting spring suspension loads to one of said connector and directly through said plate assembly to said vehicle wherein said upper plate is formed of a nonmetal composite material;

wherein said upper includes an annular flange including circumferentially spaced recesses formed therein; and wherein said lower plate includes an annular flange and circumferentially spaced offset pads corresponding to said recesses in said flange of said upper plate for receiving fastener members for securing said lower plate directly to said body structure.

2. The mount assembly set forth in claim 1 wherein:

said upper plate includes circumferentially spaced radially projecting ribs formed on said flange and deflectable under fastener loads imposed on said upper plate to allow contact between said lower plate and said body structure.

* * * * *